(12) United States Patent
Dyhrberg

(10) Patent No.: US 11,753,123 B2
(45) Date of Patent: Sep. 12, 2023

(54) VESSEL HULL CLEANING SYSTEM

(71) Applicant: CleanSubSea Operations Pty Ltd, Henderson (AU)

(72) Inventor: Roger Wayne Richard Dyhrberg, North Fremantle (AU)

(73) Assignee: CleanSubSea Operations Pty Ltd, Henderson (AU)

( * ) Notice: Subject to any disclaimer, the term of this patent is extended or adjusted under 35 U.S.C. 154(b) by 105 days.

(21) Appl. No.: 17/368,092

(22) Filed: Jul. 6, 2021

(65) Prior Publication Data
US 2021/0371062 A1 Dec. 2, 2021

Related U.S. Application Data

(63) Continuation of application No. 16/310,592, filed as application No. PCT/AU2017/050614 on Jun. 16, 2017, now abandoned.

(30) Foreign Application Priority Data

Jun. 17, 2016 (AU) .............................. 2016902373
Dec. 2, 2016 (AU) .............................. 2016904976

(51) Int. Cl.
*B63B 59/08* (2006.01)
*B08B 1/00* (2006.01)
*G06T 1/00* (2006.01)

(52) U.S. Cl.
CPC .............. *B63B 59/08* (2013.01); *B08B 1/008* (2013.01); *G06T 1/0007* (2013.01);
(Continued)

(58) Field of Classification Search
CPC ......... B63B 59/06; B63B 59/08; B63B 59/10; B63B 2059/06; B63B 2059/08;
(Continued)

(56) References Cited

U.S. PATENT DOCUMENTS 3,776,574 A 12/1973 Henderson et al.
8,386,112 B2 2/2013 Rooney, III et al.
(Continued)

FOREIGN PATENT DOCUMENTS

DE 10 2011 003623 A1 8/2012
WO 2014/043411 A1 3/2014

OTHER PUBLICATIONS

European Search Report for the European Application No. 17812330.3 dated May 22, 2019.
(Continued)

*Primary Examiner* — Daniel V Venne
(74) *Attorney, Agent, or Firm* — Kelly & Kelley, LLP

(57) ABSTRACT

A hull cleaning system is disclosed that comprises a below-waterline hull cleaning head arranged to clean an underwater portion of a hull in-situ, a location determining system arranged to produce location information indicative of the location of the hull cleaning head relative to the hull, and a hub facility remotely located relative to the hull cleaning head. The hub facility is arranged to store the location information, and the system is arranged to send the location information to the hub facility for storage at the hub facility so as to thereby provide a record at the hub facility of clean portions of the hull that have been cleaned by the hull cleaning head and fouled portions of the hull that have not yet been cleaned by the hull cleaning head. The system is also arranged to provide on-line access to the location information stored at the hub facility so as to thereby enable cleaning to continue at a subsequent time using the stored location information.

31 Claims, 9 Drawing Sheets

(52) U.S. Cl.
CPC ...... *G06T 1/0014* (2013.01); *B63B 2059/085* (2013.01); *B63B 2213/02* (2013.01)

(58) Field of Classification Search
CPC ........ B63B 2059/082; B63B 2059/085; B63B 2059/087; B63B 2213/02; G06T 1/0007; G06T 1/0014; B08B 1/002; B08B 1/008
USPC .................................. 114/221 R, 221 A, 222
See application file for complete search history.

(56) References Cited

U.S. PATENT DOCUMENTS

| | | |
|---|---|---|
| 8,506,719 B2 | 8/2013 | Holappa et al. |
| 9,051,028 B2 | 6/2015 | Smith et al. |
| 9,061,736 B2 | 6/2015 | Smith |
| 9,254,898 B2 * | 2/2016 | Rooney, III ............ B63B 59/10 |
| 10,179,634 B2 * | 1/2019 | Van Rompay .......... B08B 1/002 |
| 2007/0276552 A1 | 11/2007 | Rodocker et al. |
| 2011/0282536 A1 | 11/2011 | Rooney, III |
| 2012/0006352 A1 | 1/2012 | Holappa et al. |
| 2014/0076223 A1 | 3/2014 | Smith |
| 2014/0076224 A1 | 3/2014 | Smith |
| 2014/0076225 A1 | 3/2014 | Smith et al. |
| 2014/0076226 A1 | 3/2014 | Smith |
| 2014/0081504 A1 | 3/2014 | Smith et al. |

OTHER PUBLICATIONS

Replacement European Search Report for the European Application No. 17812330.3 dated Jun. 25, 2019.
Examination report for Egyptian application No. 2018122010.

* cited by examiner

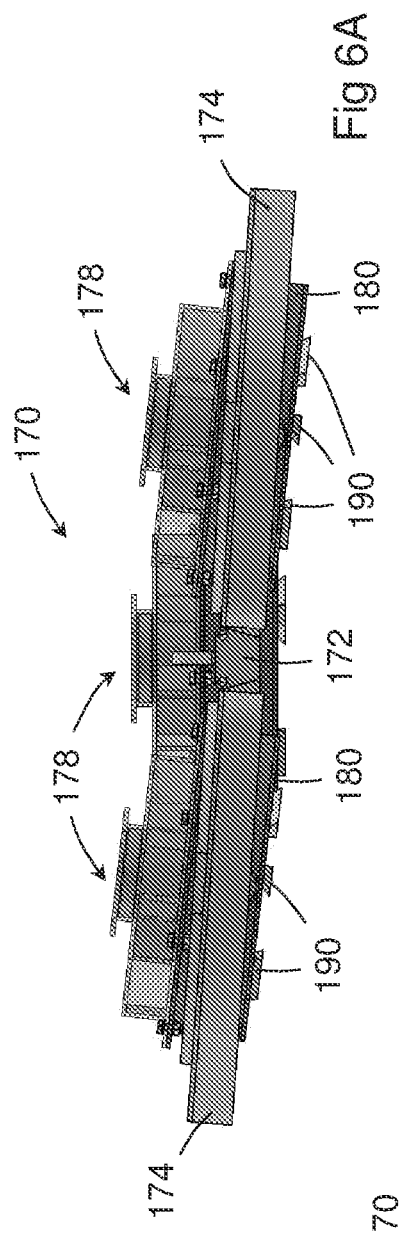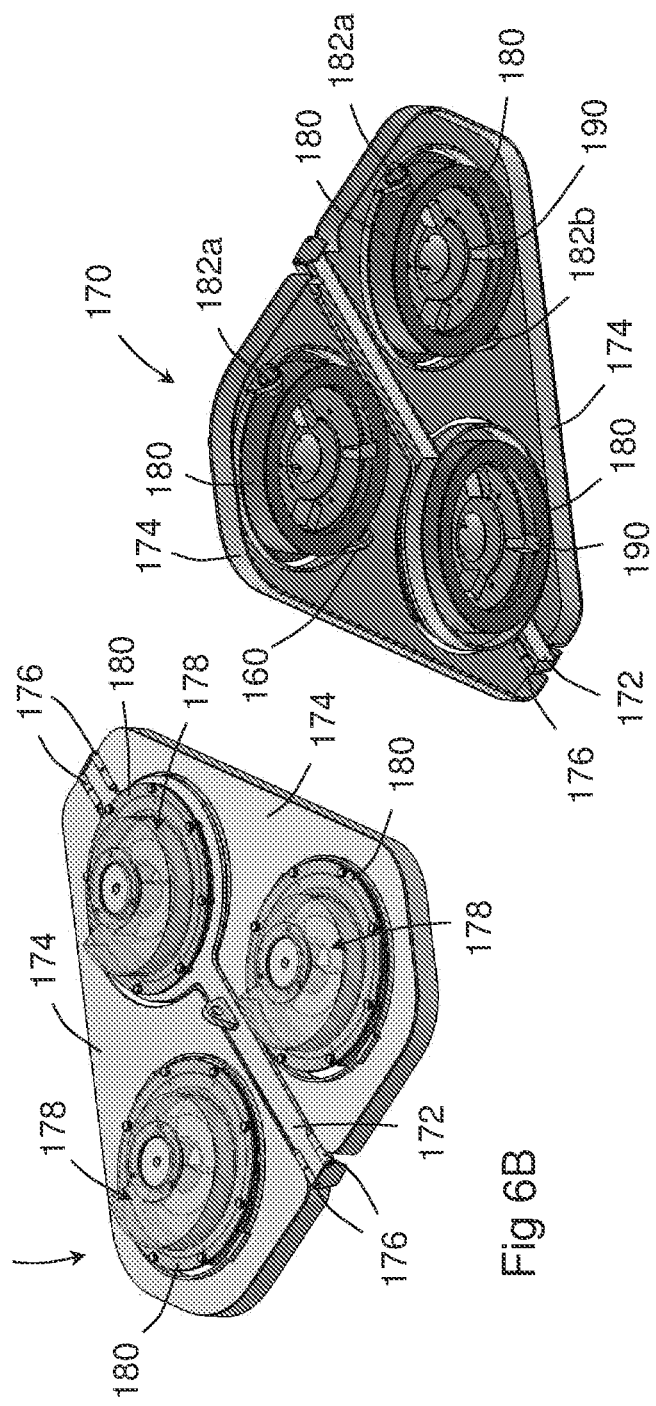

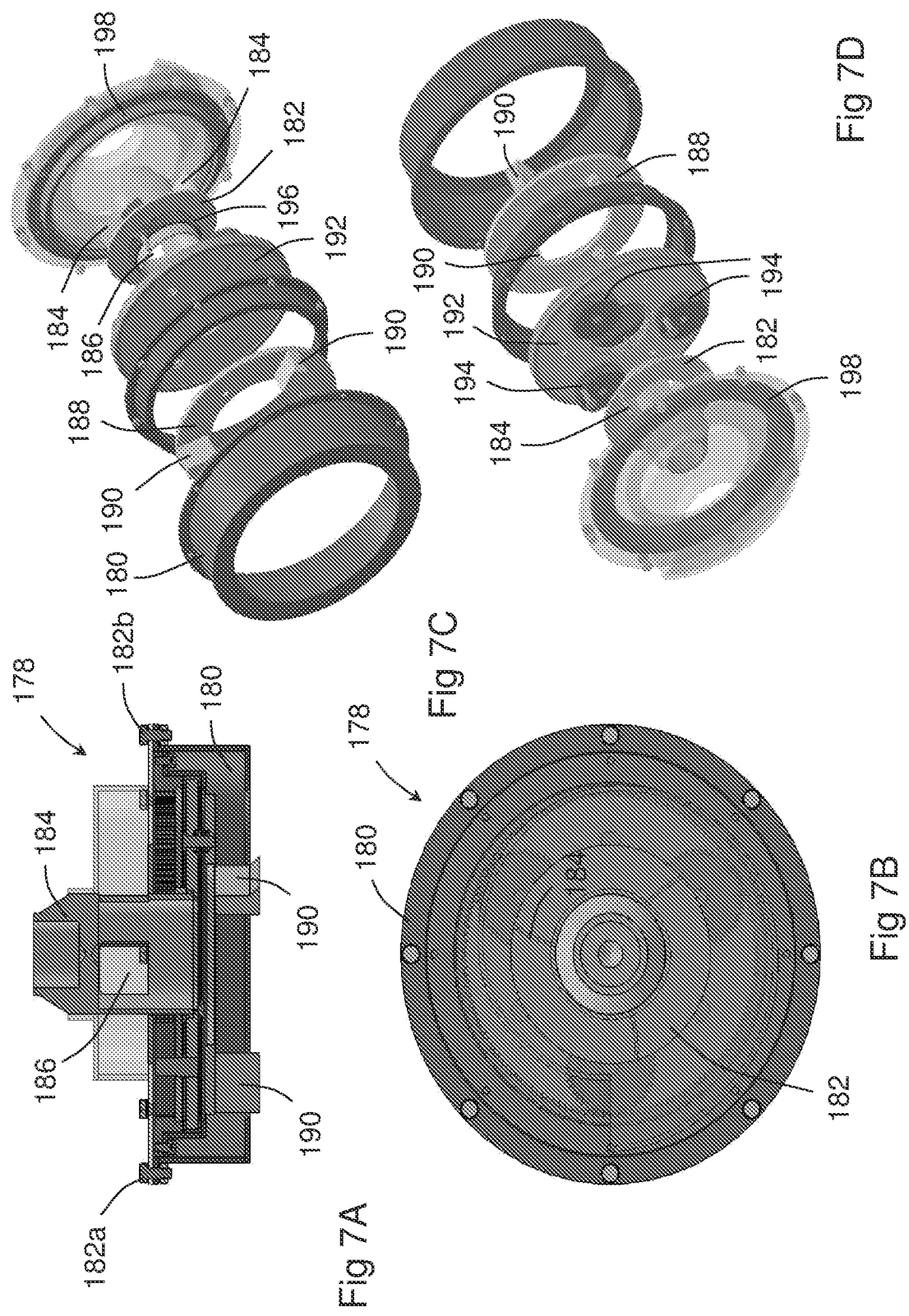

VESSEL HULL CLEANING SYSTEM

RELATED APPLICATION

This application is a continuation of U.S. application Ser. No. 16/310,592 filed Dec. 17, 2018 now abandoned.

FIELD OF THE INVENTION

The invention relates to a vessel hull cleaning system.

BACKGROUND OF THE INVENTION

A tendency exists for an underwater portion of a vessel hull to become increasingly fouled over time to the extent that eventually a significant layer of material, particularly living organisms, accumulates on the underwater portion of the vessel hull.

If such fouling is not removed from the vessel hull, significant problems can occur, including damage to the vessel hull, a reduction in seafaring performance and a significant increase in fuel consumption of the vessel. In addition, some living organisms can be noxious and dangerous to local species if transported to other locations.

Uncontained in-water cleaning can release chemical and biological contaminants into the local environment, and for example may stimulate the release of reproductive propagules, or plant and animal fragments capable of regeneration. Such biological contaminants may for example include non-indigenous marine species which if released into the local marine environment will compete with and potentially overwhelm local indigenous marine species.

As a result of such risks, uncontained abrasive in-water hull cleaning is not allowed in most major hub ports.

In order to avoid release of such contaminants into the local marine environment, conventional vessel hull cleaning techniques have involved removing the vessel from the water, and subsequently cleaning the vessel hull. However, this approach is expensive, time consuming and causes significant disruption to operation of the vessel.

SUMMARY OF THE INVENTION

In accordance with a first aspect of the present invention, there is provided a hull cleaning system comprising:

a below-waterline hull cleaning head arranged to clean an underwater portion of a hull in-situ;

a location determining system arranged to produce location information indicative of the location of the hull cleaning head relative to the hull; and a hub facility remotely located relative to the hull cleaning head, the hub facility arranged to store the location information;

the system arranged to send the location information to the hub facility for storage at the hub facility so as to thereby provide a record at the hub facility of clean portions of the hull that have been cleaned by the hull cleaning head and fouled portions of the hull that have not yet been cleaned by the hull cleaning head; and the system arranged to provide on-line access to the location information stored at the hub facility so as to thereby enable cleaning to continue at a subsequent time using the stored location information.

In an embodiment, the record at the hub facility is indicative of portions of the hull that have been cleaned by the hull cleaning head at a first location and fouled portions of the hull that have not yet been cleaned by the hull cleaning head at the first location;

the location information stored at the hub facility thereby enabling cleaning to continue at a second location different to the first location using the stored location information.

In an embodiment, the location determining system includes a cleaning head location device arranged to determine the location of the cleaning head and produce cleaning head positional information. The cleaning head location device may include a GPS device.

The location determining system may also include a vessel location device arranged to determine the location of the vessel and produce vessel positional information, the location determining system using the cleaning head positional information and the vessel positional information to produce the location information indicative of the location of the hull cleaning head relative to the hull.

In an embodiment, the system is arranged to use the cleaning head positional information and the vessel positional information to produce a vessel hull map indicative of portions of the hull that have been cleaned and portions of the hull that have not been cleaned, and to store the vessel hull map at the hub facility.

In an embodiment, the vessel location device includes a hydro acoustic position reference system.

In an embodiment, the system includes at least one image capture device arranged to capture image information indicative of at least part of the underwater portion of a hull during cleaning by the cleaning head.

The at least one image capture device may include at least one still and/or video camera. The at least one image capture device may include a high definition video camera.

In an embodiment, the hull cleaning head includes a drive mechanism for effecting movement of the hull cleaning head, and the system comprises a display and navigation controls disposed above the waterline, the display in communication with the at least one video camera and arranged to display video images captured by the at least one video camera, and the navigation controls in communication with the drive mechanism such that the drive mechanism is controllable by the navigation controls so as to control movement of the hull cleaning head.

The at least one image capture device may include at least one 3D image information capture device, which may include a laser scanner.

The at least one image capture device may include at least one front image capture device arranged to capture image information from a region adjacent a front portion of the cleaning head and thereby a fouled portion of the hull that has not yet been cleaned by the cleaning head. The system may be arranged to analyse the image information from the region adjacent the front portion of the cleaning head to determine the type of fouling on the hull, such as the type of species on the hull.

The at least one image capture device may include at least one rear image capture device arranged to capture image information from a region adjacent a rear portion of the cleaning head and thereby a clean portion of the hull that has been cleaned by the cleaning head. The system may be arranged to analyse the image information from the region adjacent the rear portion of the cleaning head to determine whether any faults are likely to exist on the hull.

In an embodiment, the hull cleaning head includes at least one magnet arranged to magnetically hold the hull cleaning head relative to a hull during a cleaning operation.

In an embodiment, the system is arranged to transport material that is separated from the hull by the cleaning head away from the cleaning head. In this regard, it will be understood that since the present system includes a cleaning head arranged to transport material released from the hull away from the cleaning head, good visibility is provided for the front and rear image capture devices, which for example assists in identifying faults on the clean portion of the hull.

The system may comprise an ultrasonic device arranged to capture ultrasonic signals and the system may be arranged to analyse the ultrasonic signals to produce information indicative of the structural condition of the hull.

The information indicative of the structural condition of the hull may include information indicative of structural integrity of weld seams, faults in a hull skin or appendages disposed on the hull, thickness of a surface coating on the vessel hull, and/or corrosion on the hull.

In an embodiment, the system includes an on-site storage device arranged to store data received from the cleaning head during a cleaning operation. The on-site storage device may be arranged to communicate with the cleaning head using a cable.

In an embodiment, the system is arranged to send data stored at the on-site storage device to the hub facility. The data may be sent periodically, and may be sent through the Internet.

In an embodiment, the system is arranged to facilitate access to data stored at the hub facility by an authorised user.

In an embodiment, the hub facility includes a web server arranged to facilitate access to the hub facility using a web browser.

In an embodiment, the hub facility includes an analysis unit arranged to process and/or analyse data stored at the hub facility.

In an embodiment, the location information is used with information from the ultrasonic transceiver and/or the image capture devices to create a vessel feature map that links locations on the hull with hull features. The hull features may include hull surface coating thickness, integrity of weld seams, faults in the hull skin or appendages disposed on the hull, thickness of a hull surface coating, corrosion on the hull, and/or species identified on the hull.

In an embodiment, the system may further include repair and/or maintenance components, for example one or more manipulators, arranged to carry out automated or remotely controlled maintenance and/or repair operations on the hull.

The analysis unit may be arranged to:
generate outputs indicative of whether any faults are identified on the hull using the ultrasonic imagery; and/or
identify the content of the fouling material on the hull, for example the species contained in the fouling material, using the imagery captured by the at least one camera; and/or
generate the vessel hull map and thereby information that is usable by an operator to recommence hull cleaning at a second port from the same location that hull cleaning ceased at a first port.

The analysis unit may be arranged to generate a warning notice if an identified species is a non-indigenous species.

In an embodiment, the analysis unit is arranged to send the warning notice to a vessel owner and/or a relevant authority associated with non-indigenous species.

In accordance with a second aspect of the present invention, there is provided a method of cleaning a hull, the method comprising:
commencing cleaning of an underwater portion of a hull in-situ using a below-waterline hull cleaning head;
producing location information indicative of the location of the hull cleaning head relative to the hull;
transferring the location information to and storing the location information at a hub facility remotely located relative to the hull cleaning head so as to thereby provide a record at the hub facility of clean portions of the hull that have been cleaned by the hull cleaning head and fouled portions of the hull that have not yet been cleaned by the hull cleaning head;
facilitating on-line access to the location information stored at the hub facility; and
re-commencing cleaning of the underwater portion of the hull in-situ at a subsequent time using the stored location information.

In an embodiment, the method comprises commencing cleaning of an underwater portion of a hull in-situ at a first location, moving a vessel associated with the hull to a second location; and re-commencing cleaning of the underwater portion of the hull in-situ at the second location at a subsequent time.

BRIEF DESCRIPTION OF THE DRAWINGS

The present invention will now be described, by way of example only, with reference to the accompanying drawings, in which:

FIGS. 6A, 6B and 6C show diagrammatic side, upper and lower views of a cleaning member module of the alternate cleaning head; and FIGS. 7A, 7B, 7C and 7D are diagrammatic cross-sectional, plan and exploded views of a cleaning assembly of the cleaning member module shown in FIG. 6;

DESCRIPTION OF AN EMBODIMENT OF THE INVENTION

Figure 1:
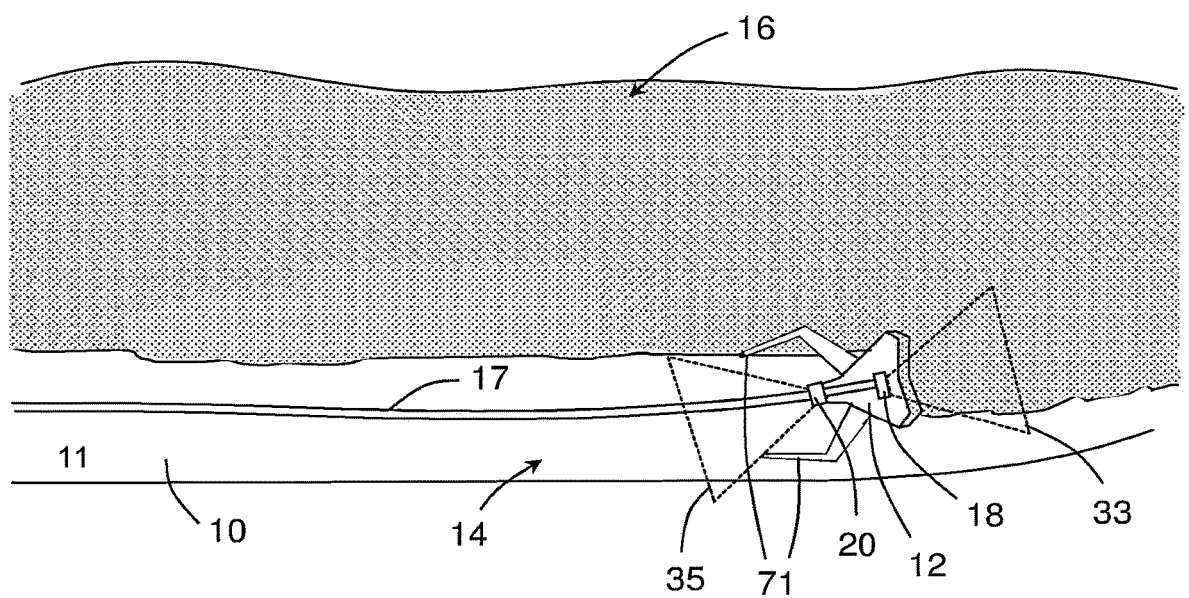
FIG. 1 is a diagrammatic representation of a vessel hull during a hull cleaning operation using a hull cleaning system in accordance with an embodiment of the present invention.
Figure 8:
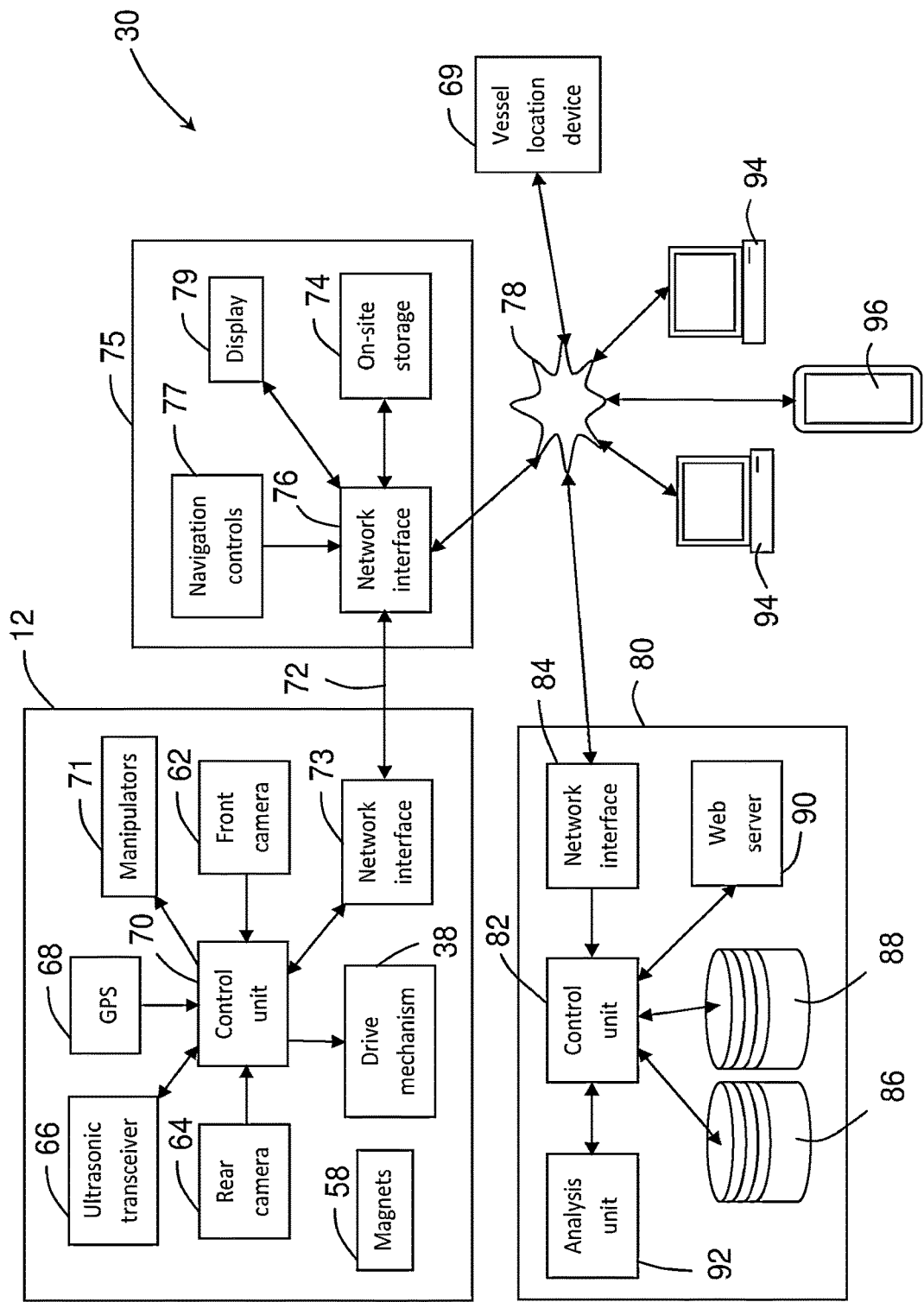
FIG. 8 is a schematic diagram of a hull cleaning system in accordance with an embodiment of the present invention.

Referring to the drawings, in FIG. 1 there is shown a portion of a vessel hull 10 during a cleaning operation using an in-situ vessel hull cleaning system 30 shown more particularly in FIG. 8.

As shown in FIG. 1, during a hull cleaning operation, fouling material present on the hull is substantially removed as a cleaning head 12 of the hull cleaning system 30 is moved relative to the hull 10. During the hull cleaning operation, the hull 10 includes a cleaned portion 14 that has been cleaned by the hull cleaning system 30 and a fouled portion 16 that has not yet been cleaned by the hull cleaning system 30.

The cleaning head 12 is arranged during use to be disposed on an underwater portion 11 of a vessel hull 10 and to separate fouling material from the vessel hull 10 as the cleaning head 12 moves relative to the hull. A suitable in-situ hull cleaning head 12 is disclosed in PCT application No. PCT/AU2013/001007, the contents of which are hereby incorporated by reference.

The cleaning head 12 is typically connected using a suitable pipe 17 to a pump (not shown) that through the pipe 17 generates negative pressure in a space defined between the cleaning head 12 and the vessel hull 10. In this way, material that is separated from the vessel hull 10 by the cleaning head 12 is discouraged from passing into the surrounding marine environment and instead is drawn away from the cleaning head 12 through the pipe 17.

In a marine environment, the fouling material present on a vessel hull 10 is typically predominantly of biological type, although other types of material may also be present.

The hull cleaning system 30 typically also includes an above-water separation device (not shown) arranged to receive a slurry of water and material separated from the vessel hull 10 and separate the water and material from each other, and a disinfection device (not shown) arranged to substantially disinfect the water that has been separated from the material. For example, the separation device may be of a type manufactured by Baleen Filters Pty Ltd, for example a B1010S Baleen filter, and the disinfection device may be of a type manufactured by Berson Milieutechniek BV, for example a Berson inline 450 UV disinfection device. The disinfection device may in addition or alternatively include a chemical based disinfection component. Flow meters and other volume measuring devices may also be included in order to improve water treatment quality.

Figure 2:
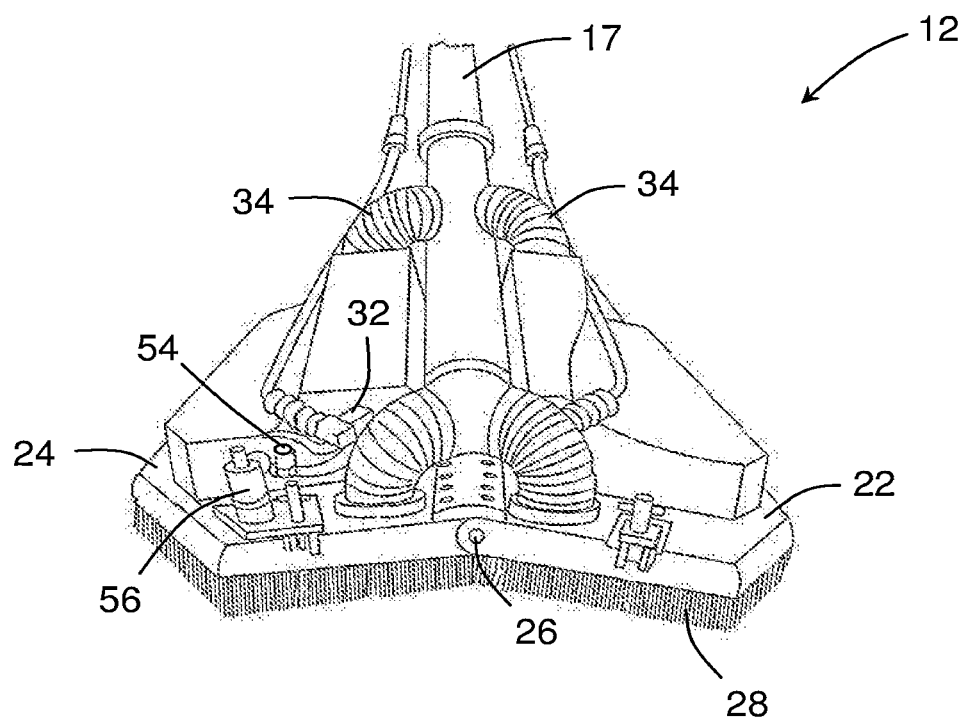
FIG. 2 is a diagrammatic upper perspective view of a cleaning head of a hull cleaning system in accordance with an embodiment of the present invention.
Figure 3:
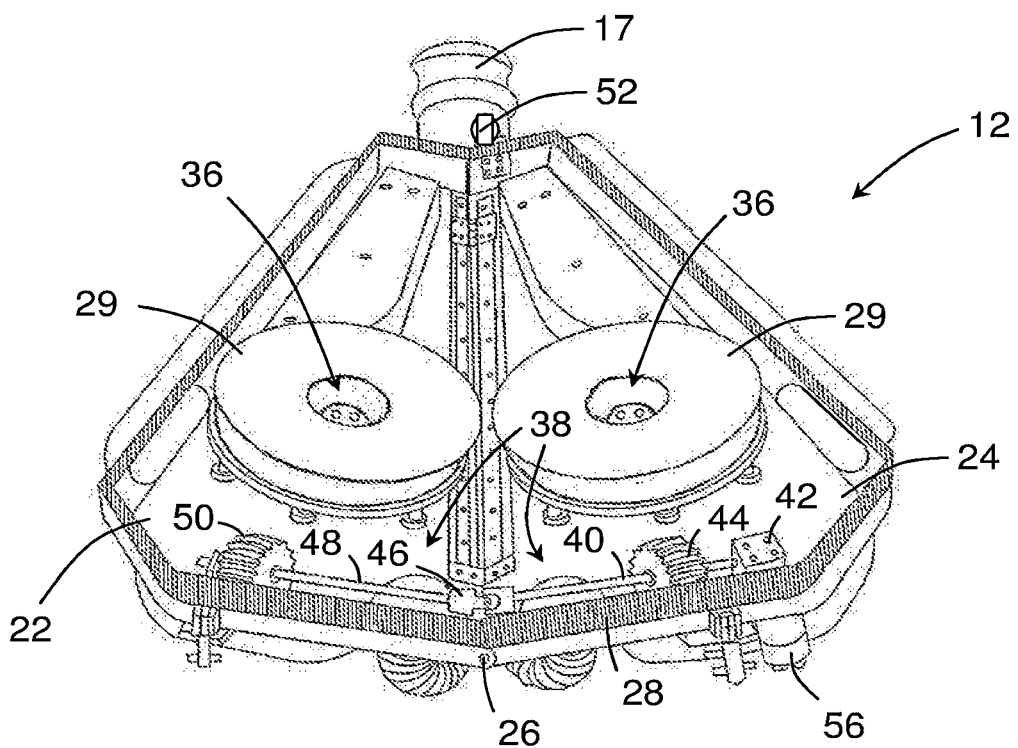
FIG. 3 is a diagrammatic lower perspective view of the cleaning head shown in FIG. 2.

As shown more particularly in FIGS. 2 and 3, an example cleaning head 12 includes first and second body portions 22, 24 that are moveably connected to each other so that the profile defined by the first and second body portions 22, 24 is adjustable. In this example, the first and second body portions 22, 24 are connected to each other by a hinge 26 that enables the first and second body portions 22, 24 to pivot relative to each other. This enables the first and second body portions 22, 24 to generally conform to the curvature of the hull 10.

A periphery defined by the first and second body portions 22, 24 is provided with a skirt portion 28, in this example of bristle like configuration. The purpose of the skirt portion 28 is to provide a seal of sufficient efficacy between the first and second body portions 22, 24 and the hull 10. In this regard, the seal should be sufficiently efficacious that the negative pressure generated by a suction pump causes material separated from the hull to be drawn away from the hull through the cleaning head 12 with minimal egression of material past the skirt portion 28 to the surrounding marine environment. This is important because biological material separated from the surface of the hull 10 has the potential to cause undesirable consequences to the surrounding environment.

In this example, the suction force generated by one or more pumps generates sufficient suction force to transport about 2000 litres of fluid per minute through a pipe about 100 m long and about 10 cm diameter, whilst achieving a sufficient seal to achieve good visibility around the cleaning head.

In this example, the cleaning head 12 includes one or more cleaning members 29 that are arranged to cause material, particularly early stage micro fouling, on the surface of the vessel hull 10 to separate from the hull surface as the cleaning members 29 rotate relative to the hull 10. In this example, two rotating cleaning members 29 are provided and each cleaning member includes one or more cleaning elements (not shown) arranged to generate a fluid current adjacent the hull 10 that causes material to be released from the hull during use substantially without touching the surface. For example, each cleaning element may include a foot portion defining a wedge shaped portion that tapers at an angle of approximately 45°, and a cut out portion at an opposite side of the cleaning element to the foot portion that defines a space of approximately the same shape and size as the foot portion.

The cleaning elements are moved during use such that the cut out portion follows the rotational path defined by the foot portion, and such that the foot and cut out portions move relative to a surface to be treated with the foot and cut out portions closely adjacent and spaced from the hull surface. Without wishing to be bound by theory, it is believed that this arrangement causes a positive pressure region to be produced adjacent the foot portion and a negative pressure region to be produced adjacent the cut out portion, and this in turn causes a fluid vortex effect adjacent the surface that causes material disposed on the surface to separate from the surface.

For more heavily fouled surfaces (macro fouling), the cleaning members 29 may be moved closer to the hull so as to contact the biofouling material and thereby cut larger barnacles (or other marine growth) from the hull 10. With this arrangement, the tapered shape of the cleaning members 29 may also act to lift marine fouling away from anti-fouling paint and prevent scratching.

In this example, the cleaning members 29 are caused to rotate by at least one first hydraulic motor 32, although it will be understood that other arrangements for causing rotation of the cleaning members 29 are envisaged. In this example, 2 first hydraulic motors 32 are provided, with each cleaning member 29 having an associated first hydraulic motor 32.

In communication with the suction pipe 17 and extending to the cleaning members 29 are first suction conduits 34, in this example in fluid communication with a hole 36 disposed centrally of the cleaning members 29.

In this example, the cleaning head 12 also includes a drive mechanism 38 arranged to effect movement of the cleaning head under control of a user.

The drive mechanism 38 includes a first drive shaft 40 connected to a reduction gearbox 42 and a first drive wheel 44 mounted on the first drive shaft 40. The first drive shaft 40 is connected through a universal joint 46 to a second drive shaft 48, and a second drive wheel 50 is mounted on the second drive shaft 48.

Since the first and second drive shafts 40, 48 are connected together through the universal joint 46, rotation of the first drive shaft 40 causes rotation of the second drive shaft 48 and thereby rotation of the first and second drive wheels 44, 50. During use, when the first and second drive wheels 44, 50 rotate, contact between the first and second drive wheels 44, 50 and the surface being cleaned causes the cleaning head 12 to move.

The drive mechanism 38 also includes a second hydraulic motor 56 arranged to cause rotation of the drive shafts 40, 48 and thereby rotation of the first and second drive wheels 44, 50.

A non-driven rear wheel 52 is also provided.

In this example, the cleaning head 12 also includes a flow control device arranged to control the flow of hydraulic fluid to the second hydraulic motor 56, and thereby the speed of rotation of the first and second drive wheels 44, 50 and the speed of movement of the cleaning head 12.

The cleaning head 12 also includes magnets (not shown) arranged to ensure that the cleaning head 12 remains attached to the hull 10 during a cleaning operation.

In this example, the drive mechanism 38 is arranged so as to be controllable by an operator from a remote location, for example from a location above the waterline adjacent the vessel using navigation controls.

It will be appreciated that the cleaning system enables an operator to substantially clean material from a surface of a vessel hull 10, in situ, because substantially all of the material removed from the surface is transported away from the surface without leeching into the surrounding water. Removal of the vessel from the water in order to effect cleaning is not necessary.

Referring to FIGS. 4, 5, 6A-6C and 7A-7D, components of an alternate cleaning head 12 for use with the cleaning system 30 are shown.

Figure 4:
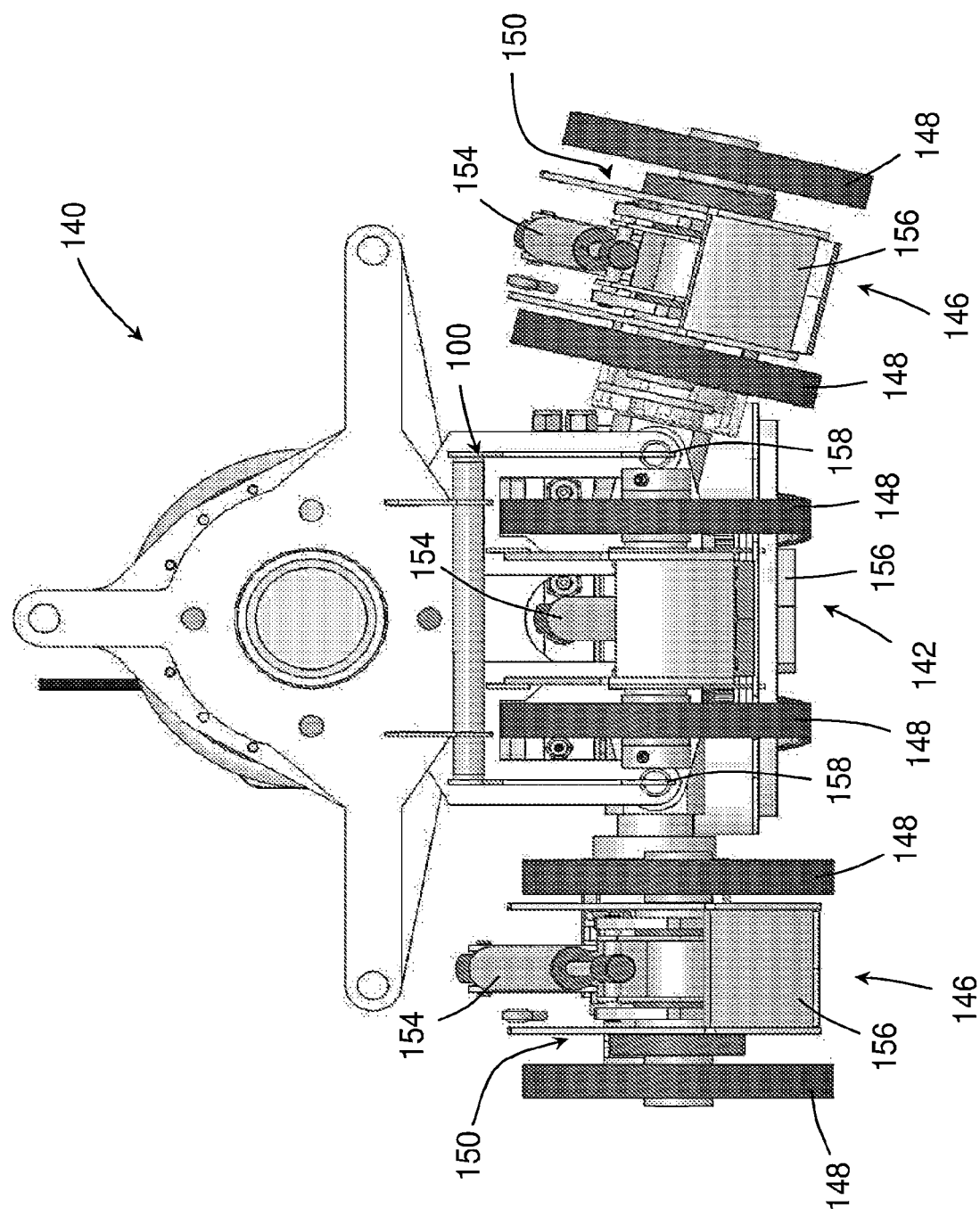
FIG. 4 is a diagrammatic front view of a drive mechanism of an alternate cleaning head of a hull cleaning system according to an embodiment of the present invention.
Figure 5:
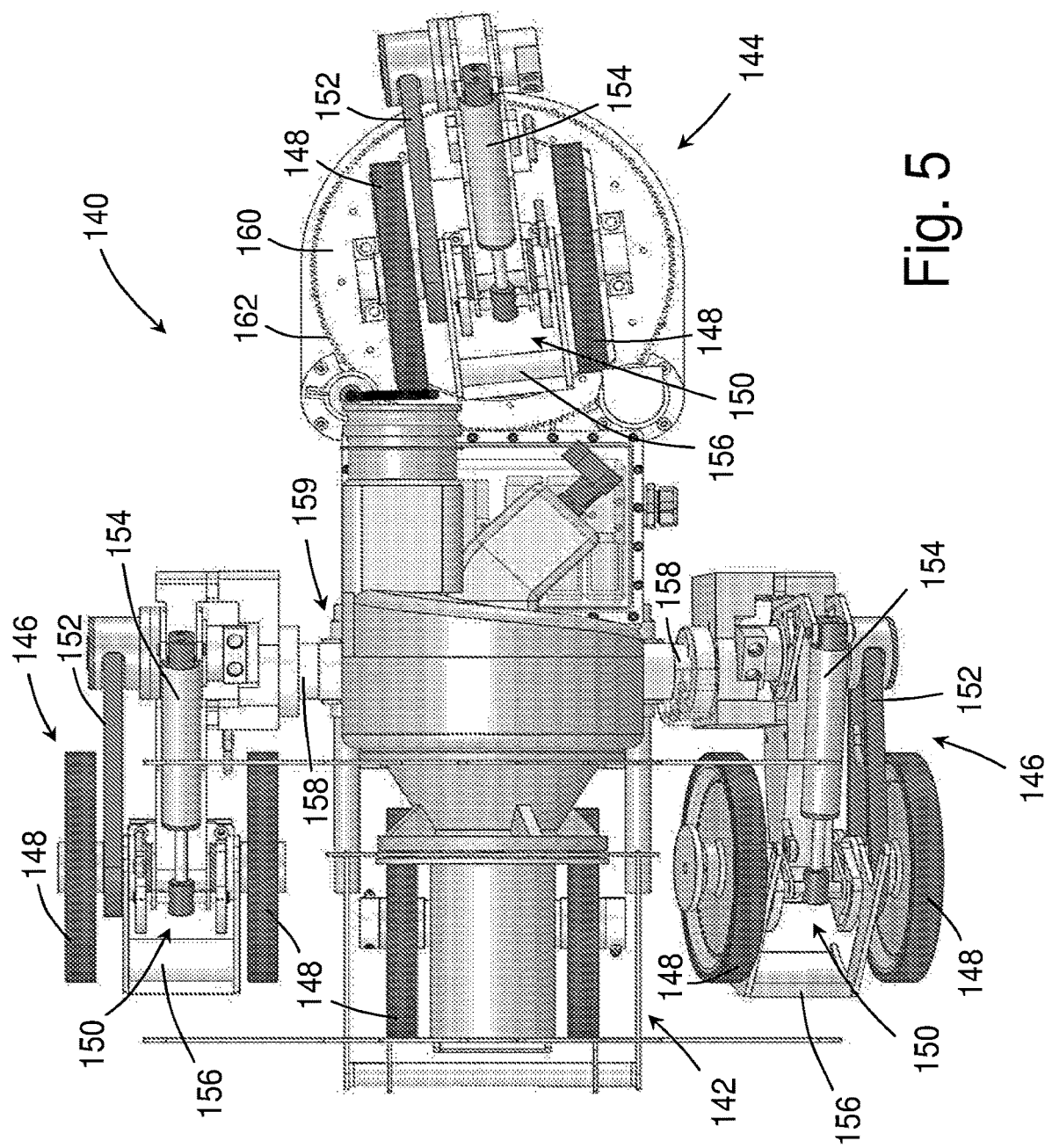
FIG. 5 is a diagrammatic plan view of the drive mechanism shown in FIG. 4.

FIGS. 4 and 5 show a drive mechanism 140 of the alternate cleaning head 12.

The drive mechanism 140 includes a fixed first drive module 142, a steerable second drive module 144, and 2 pivotable third drive modules 146. Each of the first, second and third drive modules includes a pair of wheels 148 mounted on a support structure 150 that is eccentrically mounted relative to a drive shaft (not shown) so that the support structure 150 and thereby the wheels 148 can rotate about the drive shaft. During use, the wheels 148 contact a vessel hull 10, and movement of the cleaning head 12 relative to the vessel hull is effected by effecting rotation of the wheels 148. The drive shaft is connected to the support structure 150 using a drive belt 152 so that rotation of the drive shaft effects rotation of the wheels 148 and thereby motion of the cleaning head 12 relative to a hull during use. A degree of resilience in the rotational movement of the support structure 150 about the drive shaft is achieved by providing a shock absorber 154.

In this example, the drive speed of first and second drive modules is proportional to the steerable drive wheel position so that drag is minimised when turning.

In order to ensure that the cleaning head 12 remains attached to the hull 10 during a cleaning operation, each of the drive modules 142, 144, 146 is provided with a magnet 156.

In order to enable the drive mechanism 140 to conform to the shape of a hull, each of the third drive modules 146 is connected at a pivot connection 158 to a drive mechanism frame 159. As shown more particularly in FIG. 4, such pivot connections 158 enable the third drive modules 146 to rotate about a longitudinal axis of the cleaning head 12. It will be appreciated that conformity with a vessel hull during use is also assisted by eccentrically mounting the support structure 150 so that the support structure 150 and thereby the wheels 148 can rotate about the drive shaft, and providing a biasing resilient force using the shock absorbers 154 and/or springs (not shown).

The wheel support structure 150 of the second drive module 144 is mounted on a rotatable steering plate 160. The steering plate 160 includes teeth 162 arranged to engage with a drive pinion (not shown) that is controllably rotatable in order to effect controlled rotation of the steering plate 160 and thereby controlled steering of the cleaning head 12. Rotation of the steering plate 160 and thereby steering of the cleaning head 12 is in this example controlled remotely.

FIG. 6 shows a cleaning module 170 of the alternate cleaning head 12.

The cleaning module 170 includes a base portion 172 and 2 wing portions 174 pivotably connected to the base portion 172, in this example using hinges 176. The base portion 172 and each of the wing portions 174 accommodate a cleaning assembly 178.

A cleaning assembly 178 is shown in more detail in FIGS. 7A-7D.

Each cleaning assembly 178 includes a cylindrical support housing 180 that is pivotably mounted to the respective base portion 172 or wing portion 174 at first and second pivot connections 182a, 182b such that the cleaning member 178 is rotatable about a longitudinal axis of the cleaning head 12.

The support housing 180 houses an impeller 182 having a plurality of vanes 184 and an aperture 186, rotation of the impeller 184 generating negative pressure adjacent the hull 10 during use which causes removal of material separated from the hull 10 through the aperture 186.

The support housing 180 also includes a cleaning plate 188 on which several cleaning elements 190 are accommodated. As shown more particularly in FIG. 7A, the cleaning elements 190 are of a type that cause material on the surface of the vessel hull 10 to separate from the hull surface as the cleaning elements 190 move relative to the hull 10.

The cleaning plate 188 is connected to a drive plate 192, for example using bolts, the drive plate 192 being caused to rotate using 3 slave gear wheels 194 that mesh with a drive gear wheel 196 mounted on the impeller 182 and a guide gear wheel 198. The arrangement is such that rotation of the impeller 182 causes rotation of the drive plate 192 and thereby rotation of the cleaning elements 190 relative to the hull 10.

In the absence of compensation, during use as the cleaning plate 188 and therefore the cleaning elements 190 rotate, material removed from the hull would tend to move outwardly of the axis of rotation of the cleaning plate 188. In order to overcome this, the impeller 184 is arranged to generate negative water pressure (suction) through the aperture 186 which causes fluid to flow substantially evenly around the rim of the support housing 180. Such inward flow of water compensates for the "centrifugal spit out" effect of rotation of the cleaning plate 188, thereby preventing loss of material and creating a passive suction barrier. This action allows each cleaning assembly 178 to conform to the hull 10 and travel at a forward speed of about 1 to 1.5 km per hour without any egress of material into the surrounding environment.

It will be understood that since the 2 wing portions 174 are pivotably mounted to the base portion 172, and each of the cleaning assemblies 178 is rotatable about a longitudinal axis of the cleaning head 12, the cleaning module 170 is able to articulate about generally longitudinal axes of the cleaning head 12 in order to better conform to the shape of the vessel hull 10, as shown more particularly in FIG. 6A.

The alternative cleaning head 12 is configured such that the drive mechanism wheels 148 run behind the cleaning assembly 178 so that the wheels 148 contact a substantially clean surface. This minimises damage to the anti-fouling paint on the hull 10 and ensures that contact with the hull is smooth.

Functional components of the hull cleaning system are shown in FIGS. 1 and 8.

Referring to FIGS. 1 and 8, the cleaning head 12 includes front and rear sensor packages 18, 20 that obtain information about a portion of the hull 10 adjacent the cleaning head 12 as the cleaning head moves relative to the hull 10, as described in more detail below.

The functional components include a front image capture device, in this example a front camera 62 housed in the front sensor package 18 and arranged to capture still and/or video images of the hull 10 adjacent a front portion 33; and a rear image capture device, in this example a rear camera 64 housed in the rear sensor package 20 and arranged to capture still and/or video images of the hull 10 adjacent a rear portion 35. It will be understood that the front camera 62 essentially captures images indicative of a fouled portion of the hull 10 that is about to be cleaned by the cleaning head 12, and the rear camera 64 essentially captures images indicative of a clean portion of the hull 10 that has just been cleaned by the cleaning head 12.

In the present embodiment, the front and/or rear cameras 62, 64 are high definition video cameras capable of close visual inspection.

In an embodiment wherein at least one video camera is provided, the video camera may be used to facilitate remote navigation of movement of the cleaning head 12 by an operator.

It will be understood that using high definition image cameras or for example one or more laser scanners, 3D image information indicative of the profile of the hull adjacent the front or rear portion 33, 35 may be generated.

The operative components also include an ultrasonic transceiver 66, in this example housed in the rear sensor package 20. The ultrasonic transceiver 66 is arranged to transmit ultrasonic signals towards a clean portion of the hull 10 adjacent the rear portion 35, and to receive ultrasonic signals from the hull 10 that can be used to generate information indicative of the structural condition of the hull, for example the structural integrity of weld seams and/or faults in the hull skin or appendages disposed on the hull 10, and/or thickness of a surface coating, for example antifouling paint, on the vessel hull, and/or corrosion on the hull.

The operative components also include a cleaning head location device, in this example a GPS device 68, arranged to produce positional information indicative of the location of the cleaning head 12. Using positional and orientation information of the vessel obtained from a vessel location device 69 and the cleaning head positional information, location information indicative of the location of the cleaning head 12 relative to the hull 10 can be produced. In this example, the vessel positional and orientation information is obtained using a hydro acoustic position reference system (HPR) incorporated into a port. The location information indicative of the location of the cleaning head 12 relative to the hull 10 can be used to create a vessel hull map indicative of portions of the hull 10 that have been cleaned by the cleaning head 12 and portions of the hull that have not been cleaned by the cleaning head 12.

The location information may also be used with the information from the ultrasonic transceiver 66 and/or the image capture devices 62, 64 to create a vessel feature map that links the locations on the hull with hull features, including hull surface coating thickness, integrity of weld seams, faults in the hull skin or appendages disposed on the hull 10, thickness of a hull surface coating, corrosion on the hull, and/or species identified on the hull.

The cleaning head 12 may further include repair and/or maintenance components, for example one or more manipulators 71, arranged to carry out automated or remotely controlled maintenance and/or repair operations on the hull during or subsequent to a hull cleaning operation.

For example, during a hull cleaning operation if a fault is detected in a weld seam on the hull, the manipulators(s) 71 may be arranged to automatically carry out a weld repair operation.

In order to identify species present on the hull, the system may include automated species detection components, for example in the form of suitable software that compares information obtained using the image capture devices 62, 64 and/or the ultrasonic transceiver 66 with reference information to make a determination as to the identity of the species present on the hull. Alternatively, the still and/or video information from the image capture devices 62, 64 may be viewable substantially in real-time, or subsequently, by a person so that the person can manually identify the species present.

The operative components also include a control unit 70 arranged to control and coordinate operations at the cleaning head 12, in particular operations associated with capture of images from the front and rear cameras 62, 64, capture of ultrasonic signals that can be used to produce structural integrity information associated with the hull 10, capture of GPS information indicative of the position of the cleaning head 12, and control of the drive mechanism 38 in response to instructions received from navigation controls 77.

In this example, the operative components of the cleaning head 12 are connected through a suitable cable 72 to an on-site storage device 74 disposed at a suitable local location 75 above the waterline, for example on the vessel that is in the process of being cleaned. In this example, the cleaning head 12 communicates with components at the local location 75 using a network, such as an Ethernet network, and for this purpose the cleaning head 12 includes a network interface 73.

The on-site storage device 74 is arranged to store data indicative of images captured by the front and rear cameras 62, 64, data indicative of ultrasonic signals captured by the ultrasonic transceiver 66, and data indicative of the location and orientation of the vessel and of the absolute location of the cleaning head 12 as the cleaning head 12 moves relative to the vessel. In this example, the data stored in the on-site storage device 74 is continuously or periodically received at the on-site storage device from the cleaning head 12 and the vessel location device 69, and it will be understood that the on-site storage device 74 includes suitable operative components to control and manage storage of the received data in this way.

The on-site storage device 74 is connected to or connectable to a remote hub facility 80, in this example through the Internet 78, using a network interface 76. During use, the data indicative of captured images, of captured ultrasonic signals, of the location and orientation of the vessel, and absolute location of the cleaning head 12 as the cleaning head 12 moves relative to the vessel is transferred to the hub facility 80 for storage, and subsequent processing and analysis. In this example, the data is transferred to the hub facility 80 periodically, for example every hour, although it will be understood that any suitable data transfer arrangement is envisaged.

In this example, navigation controls 77 and a display 79 are also disposed at the local location 75. The navigation controls 77 are used to steer the cleaning head, and the display 79 is arranged to receive video information from the front and/or rear cameras 62, 64 so that the environment surrounding the cleaning head 12 is visible to an operator for use by the operator in appropriately maneuvering the cleaning head using the navigation controls 77.

In this example, the video information from the front and/or rear cameras 62, 64, the navigation control signals associated with the navigation controls 77, and the information from the ultrasonic sensor 66 and/or video images for storage in the on-site storage 74 are communicated between the cleaning head 12 and the local location 75 using the network defined using the network interfaces 73, 76.

The hub facility 80 operates as a central server that receives data indicative of multiple hull cleaning operations for a vessel, for example from the ports that the vessel visits, stores the received data for subsequent processing and analysis, and makes the data and any analysis carried out on the data available on-line.

It will be understood that for a cargo vessel, typically a hull cleaning operation commences on a hull 10 of the vessel when the vessel arrives at a port, and as the hull is cleaned cargo is loaded on or unloaded from the vessel. However, insufficient time is typically available to complete cleaning of the hull before the cargo loading or unloading operation has finished. Accordingly, with current in-situ hull cleaning arrangements it is necessary to keep the vessel at the port until the cleaning operation has finished, which can be disruptive to the cargo transportation operation and therefore costly.

During operation of the present hull cleaning system 30, data indicative of the captured images, of the captured ultrasonic signals, of the location and orientation of the vessel, and of the absolute location of the cleaning head 12 as the cleaning head 12 moves relative to the vessel is transferred to the central server 80 as a cleaning operation progresses at a first port, and a hull map is created at the central server 80 that is indicative of the locations on the hull 10 that have been cleaned and the locations on the hull 10 that have not been cleaned. In this way, a record of the cleaning status of the vessel hull 10 is produced that can be used to recommence cleaning at a subsequent port when the vessel arrives at the subsequent port. In other words, the present system 30 enables vessel cleaning to commence at a first port during a loading/unloading operation and subsequently recommence at a second port after the vessel has moved from the first port to the second port. This enables the vessel to leave the first port on time, even though the vessel hull has not been completely cleaned.

A feature map may also be created that links locations on the vessel hull with hull features, for example hull surface coating thickness, integrity of weld seams, faults in the hull skin or appendages disposed on the hull 10, thickness of a hull surface coating, corrosion on the hull, and/or species identified on the hull.

The central server 80 includes a control unit 82 arranged to control and coordinate operations in the central server 80, and a network interface 84 arranged to facilitate communication with the network interface 76 of the on-site storage device 74, in this example through the Internet.

In this example, the data indicative of captured images and of captured ultrasonic signals are stored in an imagery database 86, and the data indicative of the location and orientation of the vessel and the location of the cleaning head 12 as the cleaning head 12 moves relative to the vessel is stored in a location database 88.

In this example, the central server may also be arranged to store asset management data for vessels, including data indicative of maintenance schedules, including maintenance already carried out in respect of a vessel and maintenance that is planned to be carried out in respect of a vessel.

In this example, the central server 80 also includes a web server 90 and an analysis unit 92. The analysis unit 92 is arranged to process and/or analyse the image and location data received from the cleaning head 12 and the vessel location device 69, for example so as to generate outputs indicative of whether any faults are identified on the hull 10 using the ultrasonic imagery; to identify the content of the fouling material on the hull, for example the species contained in the fouling material, using the imagery captured by the front and rear cameras 62, 64; and to generate the vessel hull map indicative of the portions of the hull 10 that have been cleaned and the portions of the hull 10 that have not been cleaned, and thereby information that is usable by an operator to recommence hull cleaning at a second port from the same location that hull cleaning ceased at a first port.

The analysis unit 92 may also be arranged to generate a warning notice if an identified species is a non-indigenous species, and for example send the warning notice to a vessel owner and/or a relevant authority associated with non-indigenous species, for example by email or SMS.

In this example, the web server 90 operates to provide an on-line user interface that is accessible by any suitable computing device, such as personal computers 94, tablet computers 96 or smart phones (not shown). The web server 90 serves web pages to a computing device, and typically the web pages will enable a user to view the information stored in the imagery and location databases 86, 88 in any suitable way; view the results of data analysis operations on the data stored in the imagery and location databases 86, 88, and/or instigate analysis operations on the data stored in the imagery and location databases 86, 88; and view vessel hull maps. However, it will be understood that any suitable arrangement for facilitating access to the central server 80 by a user is envisaged.

The system 30 may also be arranged to cross check whether a partially cleaned hull is allowed to enter a destination port that the vessel intends to travel to and to take necessary action if entry of a partially cleaned vessel is not allowed. For example, the system 30 may be arranged to send a communication to relevant operators at the source port. Such information indicative of port restrictions may be stored at the central server 80.

Figure 9A:
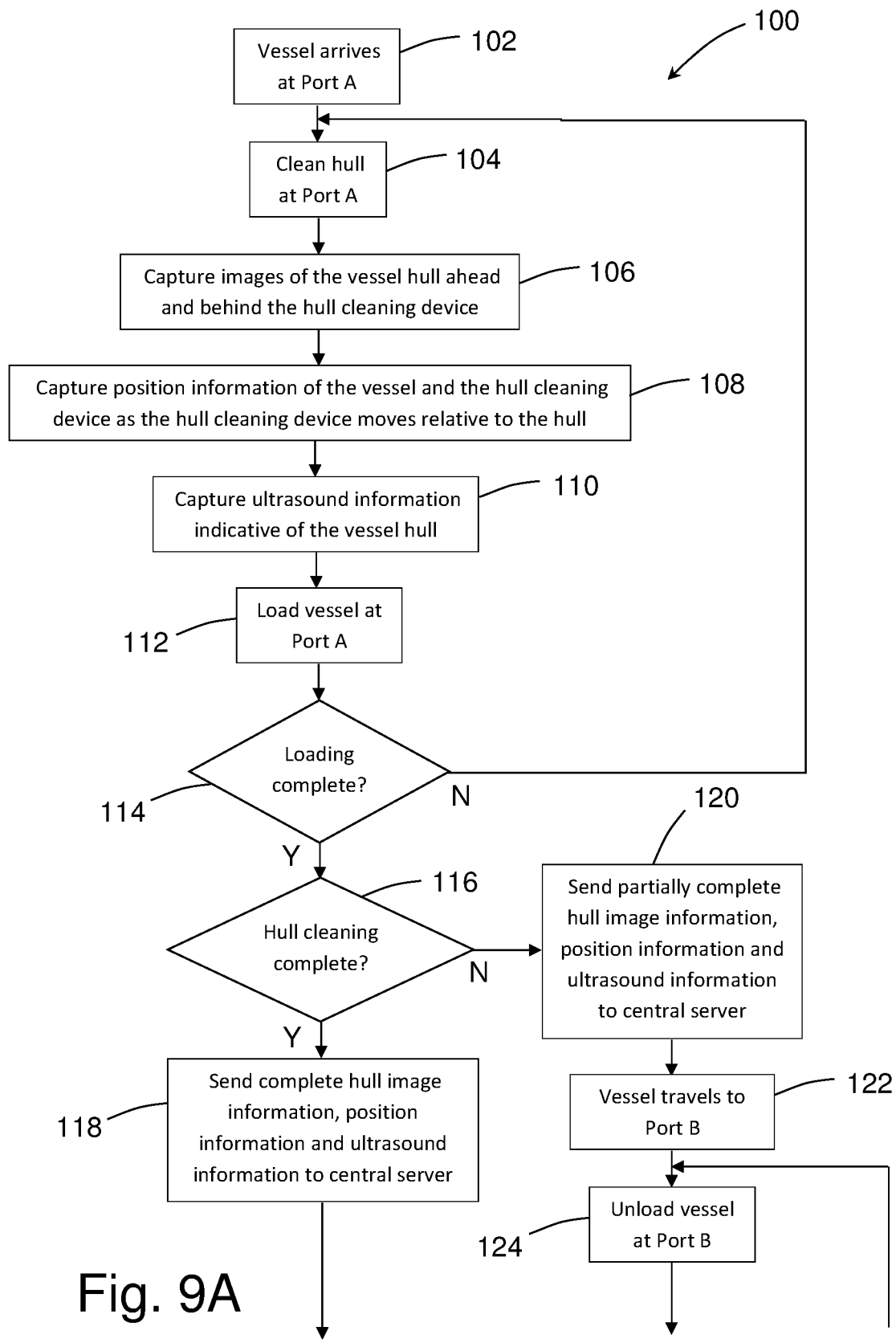
FIGS. 9A and 9B show a flow diagram illustrating a method of cleaning a vessel hull in accordance with an embodiment of the present invention.
Figure 9B:
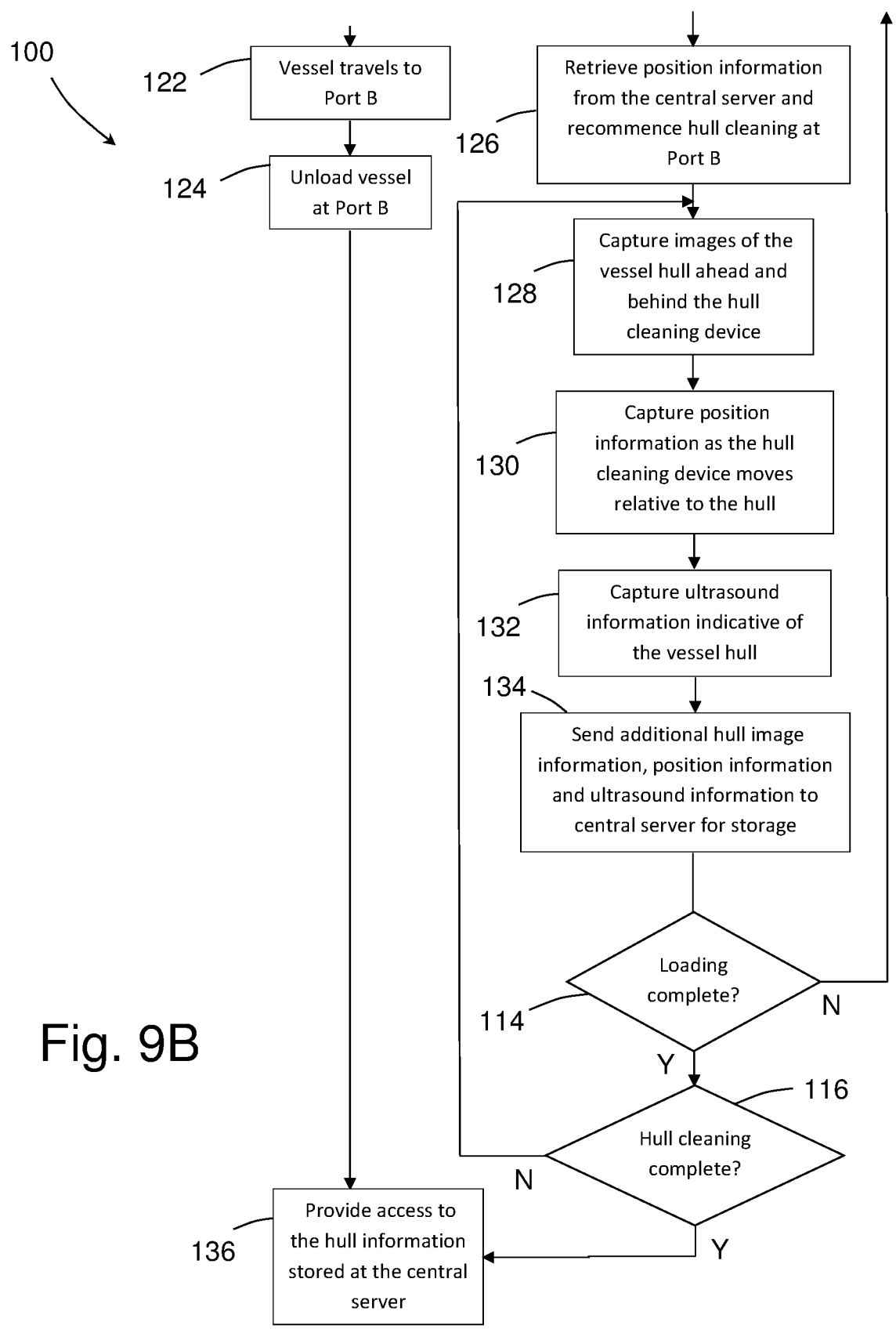

Referring to FIG. 9A-9B, a flow diagram 100 is shown that illustrates steps 102 to 136 of an example of the hull cleaning system 30 during use.

As shown, when a vessel arrives 102 at a first port, Port A, cleaning of the vessel hull using the cleaning head 12 commences 104. At the same time, images of cleaned and fouled portions the vessel hull, ultrasonic images of cleaned portions of the vessel hull, and positional information indicative of the position of the cleaning head 12 relative to the hull 10 are obtained 106, 108, 110 and stored at the on-site storage device 74. As the hull cleaning operation proceeds, the vessel is loaded/unloaded 112. After loading/unloading is complete 116, the vessel travels 122 from Port A to a second port, Port B, and the vessel is then unloaded/loaded 124 at Port B.

If the hull cleaning operation has already completed when vessel loading/unloading has completed at Port A, the complete image and location data obtained at Port A is sent 118 to the central server 80 through the Internet for storage in the imagery and location databases 86, 88.

If the hull cleaning operation has not completed when vessel loading/unloading has completed at Port A, the incomplete image and location data obtained at Port A is sent 120 to the central server 80 through the Internet for storage in the imagery and location databases 86, 88. Using the location data stored at the central server 80, a vessel hull map is generated and used to recommence 126 the hull cleaning operation at Port B. Capture of camera images, ultrasonic data and GPS location data also recommences 128, 130, 132 at Port B.

After completion of the hull cleaning operation at Port B, the remaining imagery and location data obtained at Port B is sent 134 to the central server 80 through the Internet for storage in the image and location databases 86, 88 so that a complete record of the hull cleaning operation is stored at the central server 80.

Access to the stored data and to processing/analysis tools is then made available 136 at the central server by authorised personnel, for example through a web browser.

It will be appreciated that the data stored at the hub facility serves as a historical record of hull cleaning operations for a vessel which may be useful for various purposes, including by insurance organisations.

While the above examples are described in relation to commencing cleaning of a hull at a first location and recommencing the cleaning operation at a subsequent time at a second location, it will be understood that the present system and method is also applicable to other applications. For example, the system and method are applicable to a situation wherein cleaning is commenced at a first location and recommenced at a subsequent time at the same location. This may occur for various reasons, for example because maintenance is required to be carried out on the cleaning head. In addition, it will be appreciated that cleaning may be commenced, recommenced and finalised at multiple ports, and the present system and method is not limited to 2 ports.

It will be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A hull cleaning system comprising:
a below-waterline hull cleaning head configured to clean an underwater portion of a hull of a vessel in-situ, the below-waterline hull cleaning head including cleaning assemblies pivotably mounted to conform to curvature of the underwater portion of the hull, each of the cleaning assemblies including at least one cleaning member for causing material on the underwater portion of the hull to separate from the underwater portion of the hull when the below-waterline hull cleaning head is disposed on the underwater portion of the hull during use and the at least one cleaning member moves relative to the underwater portion of the hull;
a location determining system that produces location information indicative of a location of the below-waterline hull cleaning head relative to the hull as the below-hull cleaning head moves relative to the hull, and the location determining system including a vessel location device arranged to produce vessel positional information indicative of a location of the vessel; and
a hull map derived from the location information and the vessel positional information, the hull map indicative of clean portions of the hull that have been cleaned by the below-waterline hull cleaning head and fouled portions of the hull that have not yet been cleaned by the below-waterline hull cleaning head; and
a hub facility remotely located relative to the below-waterline hull cleaning head, the hub facility storing the hull map;
the hull cleaning system configured to send the location information to the hub facility, wherein the hull map is produced by the hull cleaning system using the location information; and
the below-waterline hull cleaning head or a different below-waterline hull cleaning head configured to retrieve the hull map from the hub facility and to use the hull map to enable the respective below-waterline hull cleaning head to continue cleaning the hull at a subsequent time using the stored hull map by cleaning portions of the hull that are identified in the hull map as fouled portions of the hull that have not yet been cleaned.

2. A hull cleaning system as claimed in claim 1, wherein the hull map at the hub facility is indicative of portions of the hull that have been cleaned by the below-waterline hull cleaning head at a first location and fouled portions of the hull that have not yet been cleaned by the below-waterline hull cleaning head at the first location;
the location information stored at the hub facility thereby enabling cleaning to continue at a second location different to the first location using the stored location information.

3. A hull cleaning system as claimed in claim 1, wherein the location determining system includes:
a below-waterline hull cleaning head location device arranged to determine the location of the below-waterline hull cleaning head and produce below-waterline hull cleaning head positional information and
the vessel location device arranged to produce the vessel positional information indicative of the orientation of the vessel.

4. A hull cleaning system as claimed in claim 3, wherein the below-waterline hull cleaning head location device includes a GPS device.

5. A hull cleaning system as claimed in claim 3, wherein the vessel location device includes a hydro acoustic position reference system.

6. A hull cleaning system as claimed claim 1, wherein the below-waterline hull cleaning head includes at least one magnet arranged to magnetically hold the below-waterline hull cleaning head relative to a hull during a cleaning operation.

7. A hull cleaning system as claimed in claim 1, wherein the hull cleaning system includes at least one image capture device arranged to capture image information indicative of at least part of the underwater portion of a hull during cleaning by the below-waterline hull cleaning head.

8. A hull cleaning system as claimed in claim 7, wherein the below-waterline hull cleaning head includes a drive mechanism for effecting movement of the below-waterline hull cleaning head, and the hull cleaning system comprises a display and navigation controls disposed above the waterline, the display in communication with the at least one video camera and arranged to display video images captured by the at least one video camera, and the navigation controls in communication with the drive mechanism such that the drive mechanism is controllable by the navigation controls so as to control movement of the below-waterline hull cleaning head.

9. A hull cleaning system as claimed in claim 7, wherein the at least one image capture device includes at least one front image capture device arranged to capture image information from a region adjacent a front portion of the below-waterline hull cleaning head and thereby a fouled portion of the hull that has not yet been cleaned by the below-waterline hull cleaning head.

10. A hull cleaning system as claimed in claim 9, wherein the hull cleaning system is arranged to analyse the image information from the region adjacent the front portion of the below-waterline hull cleaning head to determine the type of species on the hull.

11. A hull cleaning system as claimed in claim 7, wherein the at least one image capture device includes at least one rear image capture device arranged to capture image information from a region adjacent a rear portion of the below-waterline hull cleaning head and thereby a clean portion of the hull that has not been cleaned by the below-waterline hull cleaning head.

12. A hull cleaning system as claimed in claim 11, wherein the hull cleaning system is arranged to analyse the image information from the region adjacent the rear portion of the below-waterline hull cleaning head to determine whether any faults are likely to exist on the hull.

13. A hull cleaning system as claimed in claim 1, including an ultrasonic device arranged to capture ultrasonic signals, the hull cleaning system arranged to analyse the ultrasonic signals to produce information indicative of the structural condition of the hull.

14. A hull cleaning system as claimed in claim 13, wherein the information indicative of the structural condition of the hull includes information indicative of structural integrity of weld seams, faults in a hull skin or appendages disposed on the hull, thickness of a surface coating on the vessel hull, and/or corrosion on the hull.

15. A hull cleaning system as claimed in claim 1, wherein the hub facility includes an analysis unit arranged to process and/or analyse data stored at the hub facility.

16. A hull cleaning system as claimed in claim 1, wherein the location information is used to create a vessel feature map that links locations on the hull with hull features.

17. A hull cleaning system as claimed in claim 16, wherein the hull features include hull surface coating thickness, integrity of weld seams, faults in the hull skin or appendages disposed on the hull, thickness of a hull surface coating, corrosion on the hull, and/or species identified on the hull.

18. A hull cleaning system as claimed claim 1, comprising at least one repair and/or maintenance component arranged to carry out automated or remotely controlled maintenance and/or repair operations on the hull.

19. A method of cleaning a hull of a vessel, the method comprising:
commencing cleaning of an underwater portion of a hull of a vessel in-situ using a below-waterline hull cleaning head, the below-waterline hull cleaning head including cleaning assemblies pivotably mounted to conform to curvature of the underwater portion of the hull, each of the cleaning assemblies including at least one cleaning member for causing material on the underwater portion of the hull to separate from the underwater portion of the hull when the below-waterline hull cleaning head is disposed on the underwater portion of the hull during use and the at least one cleaning member moves relative to the underwater portion of the hull; and
the method including:
determining location of the vessel, and producing vessel positional information indicative of the vessel location; and
producing location information indicative of a location of the below-waterline hull cleaning head relative to the hull as the below-waterline hull cleaning head moves relative to the hull; and
producing a hull map by using the vessel positional information and the location information, the hull map being indicative of clean portions of the hull that have been cleaned by the below-waterline hull cleaning head and fouled portions of the hull that have not yet been cleaned by the below-waterline hull cleaning head;
transferring the vessel positional information and the location information to and storing the location information;
retrieving the stored hull map by the below-waterline hull cleaning head or a different below-waterline hull cleaning head; and
re-commencing cleaning of the underwater portion of the hull in-situ at a subsequent time by the below-waterline hull cleaning head or the different below-waterline hull cleaning head by cleaning portions of the hull that are identified in the hull map as fouled portions of the hull that have not yet been cleaned.

20. A method as claimed in claim 19, comprising:
commencing cleaning of an underwater portion of a hull in-situ at a first location, moving a vessel associated with the hull to a second location; and
re-commencing cleaning of the underwater portion of the hull in-situ at the second location at a subsequent time.

21. A method as claimed in claim 19, wherein producing the location information indicative of the location of the below-waterline hull cleaning head relative to the hull comprises:
determining the location of the below-waterline hull cleaning head and producing below-waterline hull cleaning head positional information; and
producing the vessel positional information indicative of the orientation of the vessel.

22. A method as claimed in claim 19, comprising capturing image information indicative of at least part of the underwater portion of a hull during cleaning by the below-waterline hull cleaning head.

23. A method as claimed in claim 22, comprising capturing image information from a region adjacent a front portion of the below-waterline hull cleaning head and thereby a fouled portion of the hull that has not yet been cleaned by the below-waterline hull cleaning head.

24. A method as claimed in claim 23, comprising analysing the image information from the region adjacent the front portion of the below-waterline hull cleaning head to determine the type of species on the hull.

25. A method as claimed in claim 19, comprising capturing image information from a region adjacent a rear portion of the below-waterline hull cleaning head and thereby a clean portion of the hull that has not been cleaned by the below-waterline hull cleaning head.

26. A method as claimed in claim 19, comprising analysing the image information from the region adjacent the rear portion of the below-waterline hull cleaning head to determine whether any faults are likely to exist on the hull.

27. A method as claimed in claim 19, comprising capturing ultrasonic signals, and analysing the ultrasonic signals to produce information indicative of the structural condition of the hull.

28. A method as claimed in claim 27, wherein the information indicative of the structural condition of the hull includes information indicative of structural integrity of weld seams, faults in a hull skin or appendages disposed on the hull, thickness of a surface coating on the vessel hull, and/or corrosion on the hull.

29. A method as claimed in claim 19, comprising using the location information to create a vessel feature map that links locations on the hull with hull features.

30. A method as claimed in claim 29, wherein the hull features include hull surface coating thickness, integrity of weld seams, faults in the hull skin or appendages disposed on the hull, thickness of a hull surface coating, corrosion on the hull, and/or species identified on the hull.

31. A hull cleaning system comprising:
- a below-waterline hull cleaning head configured to clean an underwater portion of a hull of a vessel in-situ, the below-waterline hull cleaning head including cleaning assemblies pivotably mounted to conform to curvature of the underwater portion of the hull, each of the cleaning assemblies including at least one cleaning member for causing material on the underwater portion of the hull to separate from the underwater portion of the hull when the below-waterline hull cleaning head is disposed on the underwater portion of the hull during use and the at least one cleaning member moves relative to the underwater portion of the hull;
- a suction arrangement configured to draw the material separated from the underwater portion of the hull away from the hull through the hull below-waterline cleaning head;
- a location determining system that produces location information indicative of a location of the below-waterline hull cleaning head relative to the hull as the below-waterline hull cleaning head moves relative to the hull, and the location determining system including a vessel location device arranged to produce vessel positional information indicative of a location of the vessel; and
- a hull map derived from the location information and the vessel positional information, the hull map indicative of clean portions of the hull that have been cleaned by the below-waterline hull cleaning head and fouled portions of the hull that have not yet been cleaned by below-waterline the hull cleaning head; and
- a hub facility remotely located relative to the below-waterline hull cleaning head, the hub facility storing the hull map;
- the hull cleaning system configured to send the location information to the hub facility, wherein the hull map is produced by the hull cleaning system using the location information; and
- the below-waterline hull cleaning head or a different below-waterline hull cleaning head configured to retrieve the hull map from the hub facility and to use the hull map to enable the respective below-waterline hull cleaning head to continue cleaning the hull at a subsequent time using the stored hull map by cleaning portions of the hull that are identified in the hull map as fouled portions of the hull that have not yet been cleaned.

* * * * *